(12) United States Patent
Fellague (10) Patent No.: US 9,045,166 B2
(45) Date of Patent: Jun. 2, 2015

(54) SHORT OFFSET SHEET METAL REINFORCEMENT TO LIMIT ROTATION DURING CRASH

(71) Applicant: Ford Global Technologies, LLC, Dearborn, MI (US)

(72) Inventor: Nour-Eddine Fellague, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/950,528

(22) Filed: Jul. 25, 2013

(65) Prior Publication Data

US 2015/0028627 A1 Jan. 29, 2015

(51) Int. Cl.
*B60R 25/04* (2013.01)
*B62D 25/04* (2006.01)
*B62D 21/15* (2006.01)

(52) U.S. Cl.
CPC .............. *B62D 25/04* (2013.01); *B62D 21/157* (2013.01)

(58) Field of Classification Search
CPC .............................. B62D 25/04; B62D 21/157

USPC ........................... 296/193.06, 187.12, 193.05
See application file for complete search history.

(56) References Cited

U.S. PATENT DOCUMENTS

| | | | |
|---|---|---|---|
| 5,246,264 A | | 9/1993 | Yoshii |
| 6,397,553 B1 | | 6/2002 | Horikawa et al. |
| 6,705,668 B1 | | 3/2004 | Makita et al. |
| 7,445,269 B2 * | 11/2008 | Yustick et al. ........... | 296/187.01 |
| 7,543,882 B2 | | 6/2009 | Day et al. |
| 7,976,098 B2 | | 7/2011 | Nishimura et al. |
| 8,128,157 B2 * | | 3/2012 | Heo et al. ................. 296/193.06 |
| 2012/0119477 A1 * | | 5/2012 | Kim ........................... 280/801.2 |
| 2013/0020833 A1 | | 1/2013 | Yao |

\* cited by examiner

*Primary Examiner* — Joseph D Pape
(74) *Attorney, Agent, or Firm* — Raymond Coppiellie; Price Heneveld LLP (57) ABSTRACT

A vehicle frame includes a pillar having inner and outer members and an interior surface defining a cavity. A first reinforcement is disposed in the cavity and welded to the interior surface. A second reinforcement includes first and second edges and a channel extending therebetween. The first and second edges are welded to the first reinforcement and the channel is positioned distal from the first reinforcement proximate a deflection area of the pillar.

20 Claims, 8 Drawing Sheets

SHORT OFFSET SHEET METAL REINFORCEMENT TO LIMIT ROTATION DURING CRASH

FIELD OF THE INVENTION

The present invention generally relates to a vehicle structural frame and, more specifically, a vehicle structural frame having a short reinforcement member offset from the primary structural member.

BACKGROUND OF THE INVENTION

The structural supports for a roof of a vehicle include various pillars that extend downward from the roof to either the side panels or the floor member of the vehicle. In a vehicle such as a sedan, the frame includes a front A-pillar, a middle B-pillar, and a rear C-pillar. These pillars are designed to receive crush-type forces placed upon a roof in a rollover crash or other type of crash where a vertical force is applied to the roof of the vehicle. In these pillars, weak areas are reinforced with sheet metal that is welded to the pillar. However, as reinforcement is added to one weaker area, other weaker areas appear. This trend of applying reinforcement can continue until the pillar reaches its load limit with weak areas still remaining within the pillar. This method of reinforcement generally serves to shift the weakened areas of the pillar from one point to another.

SUMMARY OF THE INVENTION

According to one aspect of the present invention, a vehicle frame includes a pillar having an interior surface defining a pillar cavity and a deflection area. A first reinforcement disposed in the pillar cavity is at least partially attached to the interior surface of the pillar cavity proximate the deflection area. A second reinforcement is coupled to the first reinforcement at first and second edges of the second reinforcement. In this manner, a gap is defined between portions of the first and second reinforcements proximate the deflection area.

According to another aspect of the present invention, a vehicle frame includes a pillar having inner and outer members and an interior surface defining the pillar cavity. A first reinforcement is positioned within the pillar cavity and is at least partially disposed on the interior surface and welded to the inner member. A second reinforcement having a channel extending between first and second edges is welded to the first reinforcement, wherein the first and second edges are welded to the first reinforcement and the channel is distal from the first reinforcement to define a gap positioned proximate a deflection area of the pillar.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
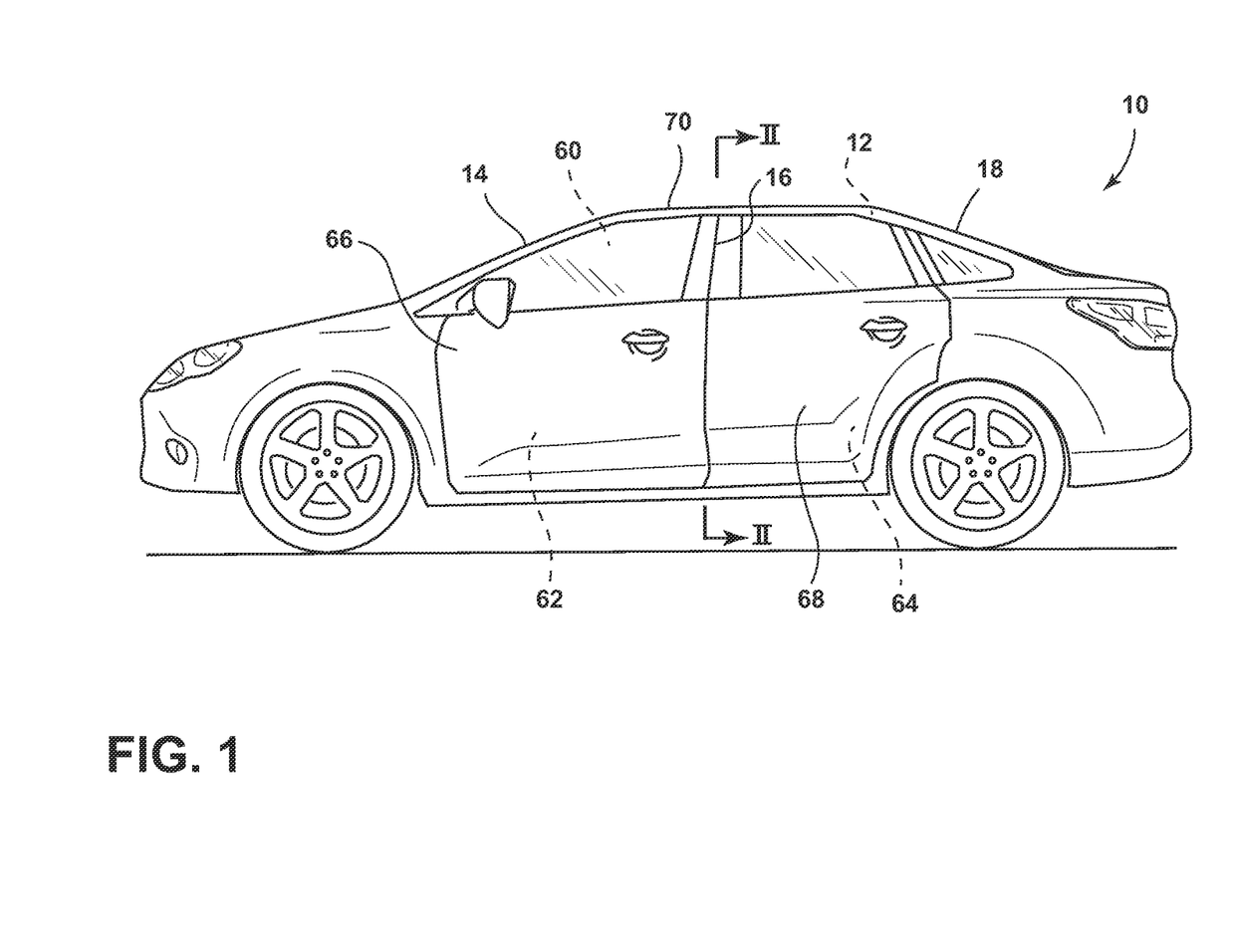
FIG. 1 is an elevation view of a vehicle showing one embodiment of the present invention.
Figure 2:
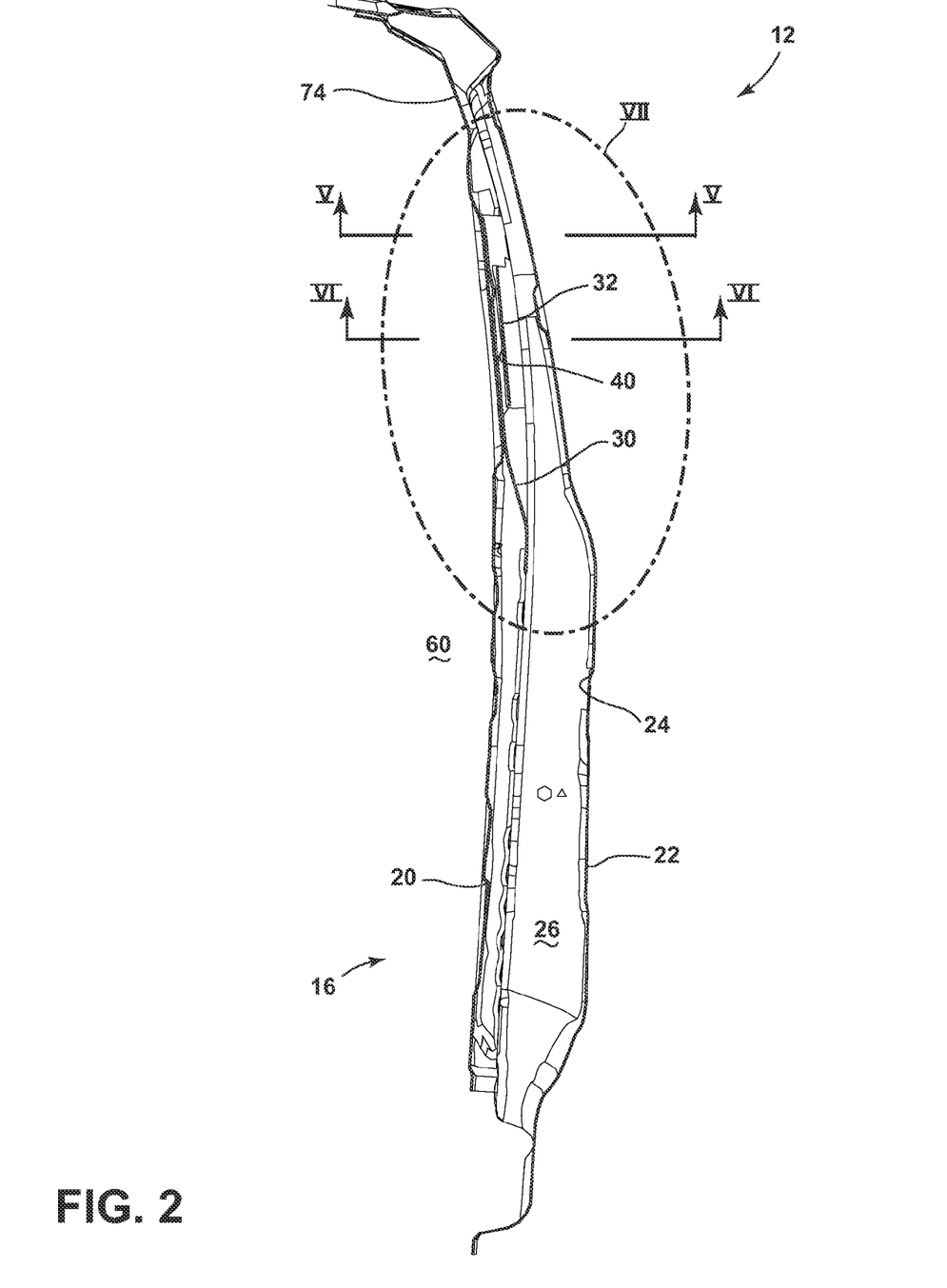
FIG. 2 is a section of the embodiment of FIG. 1 taken at line II-II.
Figure 3:
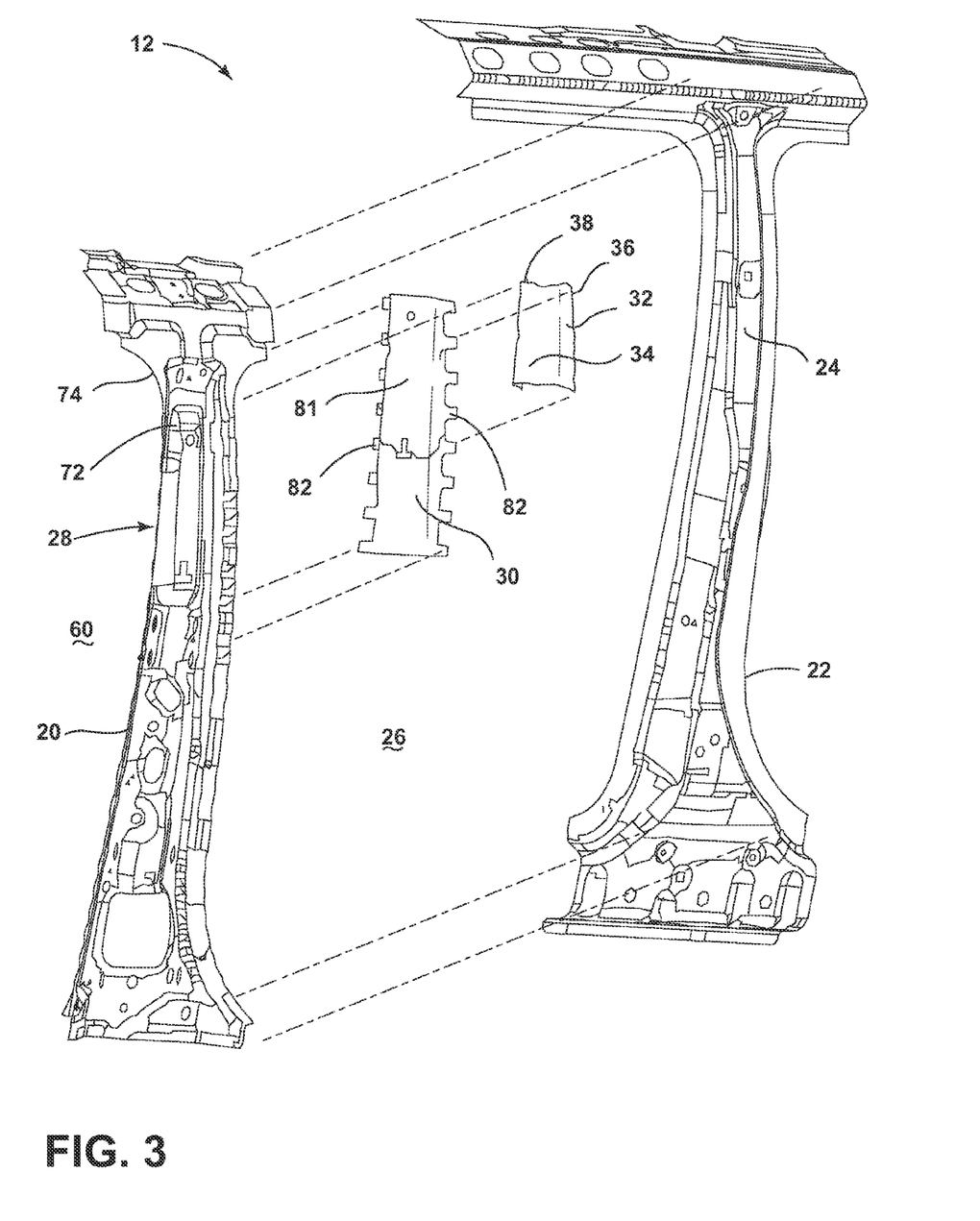
FIG. 3 is an exploded perspective of the embodiment of FIG. 2 viewed from the cabin side of the pillar.
Figure 4:
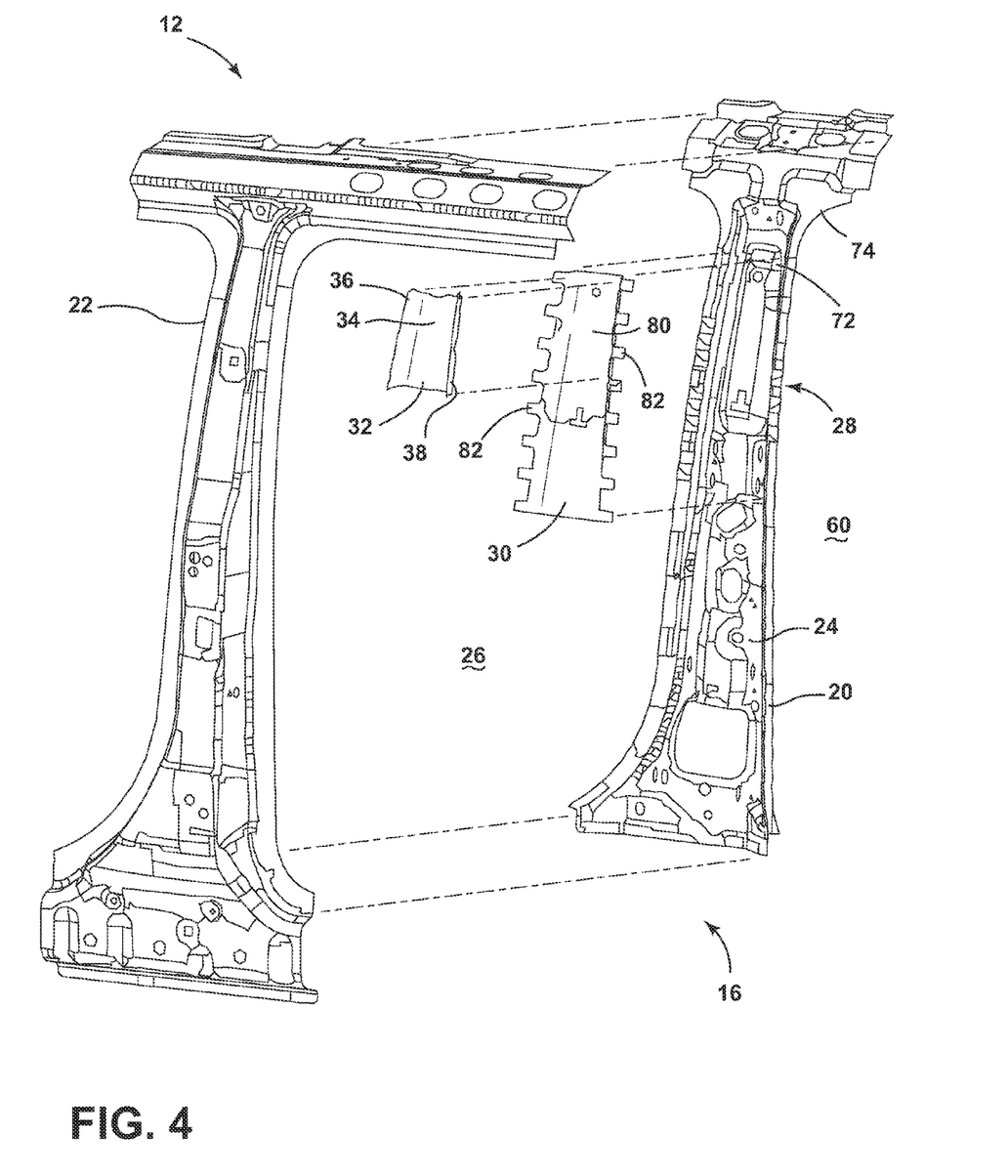
FIG. 4 is an exploded perspective of the embodiment of FIG. 2 viewed from the exterior side of the pillar.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-4, reference numeral 10 generally refers to a wheel motor vehicle having a frame 12 and including a front A-pillar 14, a middle B-pillar 16, and a rear C-pillar 18. The B-pillar 16 includes inner and outer members 20, 22, an interior surface 24 defining a pillar cavity 26 and a crushing deflection area 28. A first reinforcement 30 is disposed within the pillar cavity 26 and is at least partially attached to the interior surface 24 of the inner member 20 proximate the crushing deflection area 28. A second reinforcement 32 includes a channel 34 extending between first and second edges 36, 38, wherein the first and second edges 36, 38 are welded to the first reinforcement 30 proximate the crushing deflection area 28. The channel 34 of the second reinforcement 32 is positioned distal from the first reinforcement 30 to define a gap 40 proximate the crushing deflection area 28 such that the first and second reinforcements 30, 32 define a delayed deflection support configured to supply additional structural support to the pillar at the crushing deflection area 28 after the pillar has deflected a predetermined distance.

As shown in FIGS. 1-4, the B-pillar 16 is illustrated, wherein the B-pillar 16 is located at the side of the vehicle cabin 60 between a front cabin area 62 and a rear cabin area 64 proximate the front side and rear side doors 66, 68 of the vehicle 10. The pillars of the vehicle frame 12 are designed to receive substantially vertical loads placed upon the roof 70. Crush-type forces can be exerted upon a vehicle roof 70 as a result of crashes such as a crush, a rollover collision, an impact from above, or other downward impact force placed upon the roof 70. The B-pillar 16 includes an inner member 20 connected to an outer member 22, wherein the inner and outer members 20, 22 are cooperatively designed to have a specific geometry that locates the crushing deflection area 28 in a predetermined location on the B-pillar 16. As shown in the illustrations, the crushing deflection area 28 is comprised of a series of convex and concave portions 72 that cooperate to transfer downward forces to outwardly lateral forces that cause a controlled deflection in the B-pillar 16 necessary to protect the occupants of the cabin 60 area of the vehicle 10.

The B-pillar 16 receives these loads by deflecting at a predetermined location, in this case, the crushing deflection area 28. The crushing deflection area 28 is configured such that when a crushing force is placed upon the roof 70, the B-pillar 16 deflects in a predetermined direction, in this case outwardly, at the crushing deflection area 28 to minimize intrusion of the roof 70 and the B-pillar 16 into the passenger area of the vehicle 10, thereby minimizing injury caused by the crushing force and the resulting deflection of the vehicle frame 12. The crushing deflection area 28 is disposed in an upper portion 74 of the B-pillar 16 where the first and second reinforcements 30, 32 are disposed within the pillar cavity 26. It should be understood that the exact location, configuration, deflection direction and geometry of the crushing deflection area 28 can vary depending on the design of the vehicle 10.

Referring now to FIGS. 4-7, the first reinforcement 30 is placed adjacent to the inner member 20 of the B-pillar 16, where the inner member 20 is disposed on a cabin 60 side of the B-pillar 16 and the outer member 22 is disposed on an exterior side of the B-pillar 16. The first reinforcement 30 includes a convex portion 80 that is received by the interior surface 24 of the B-pillar 16. Two outer flanges 82 of the first reinforcement 30 are welded to the B-pillar 16 proximate where the inner member 20 of the B-pillar 16 and the outer member 22 of the B-pillar 16 are connected. The convex portion 80 of the first reinforcement 30 can also be welded to the inner member 20 of the B-pillar 16. In various embodiments, the first reinforcement 30 and the inner member 20 of the B-pillar 16 can define minor inner channels 84 of the B-pillar 16 that can add to the strength of the B-pillar 16 under typical stress situations experienced during typical operation of the vehicle 10. In addition, the minor inner channels 84 can assist the B-pillar 16 and the crushing deflection area 28 to deflect in the predetermined direction during various crash situations that can include, but are not limited to, crushes, vertical impacts, lateral impacts, and the like. In addition to crush-type impacts, the disclosed embodiments can also provide supplemental structural support in other types of crashes, which include, but are not limited to, front, rear and side impacts.

Figure 5:
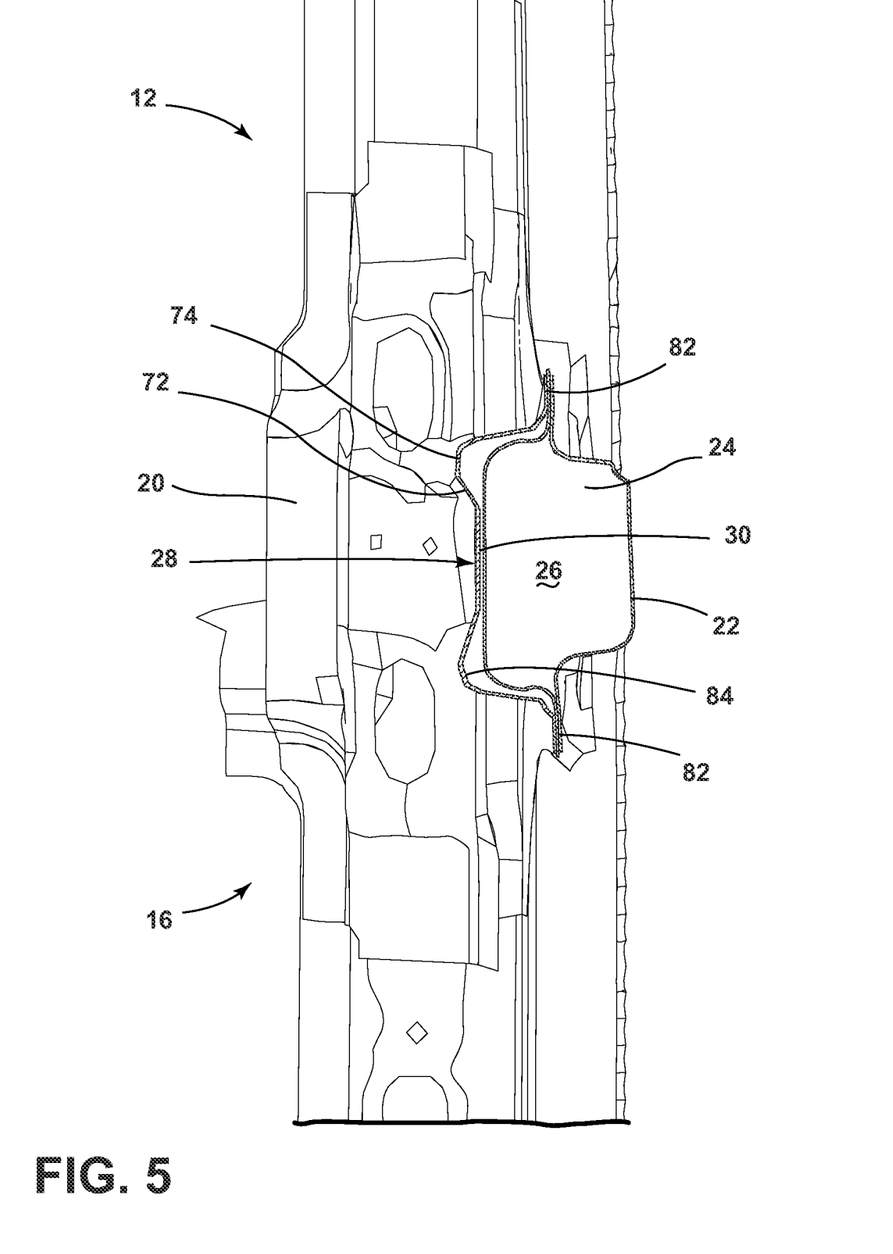
FIG. 5 is a section of the embodiment of FIG. 2 taken at line V-V.
Figure 6:
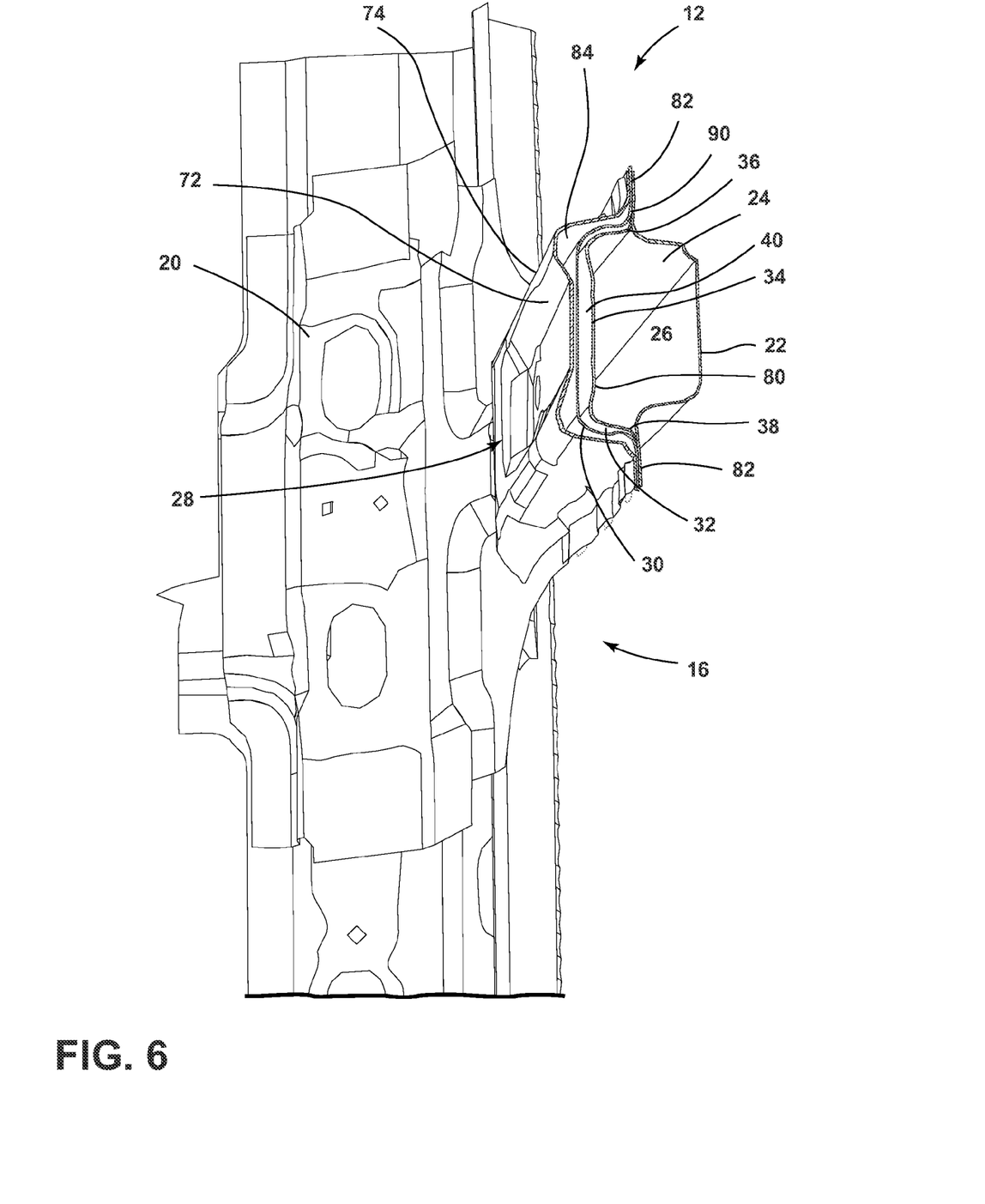
FIG. 6 is a section of the embodiment of FIG. 2 taken at line VI-VI.
Figure 7:
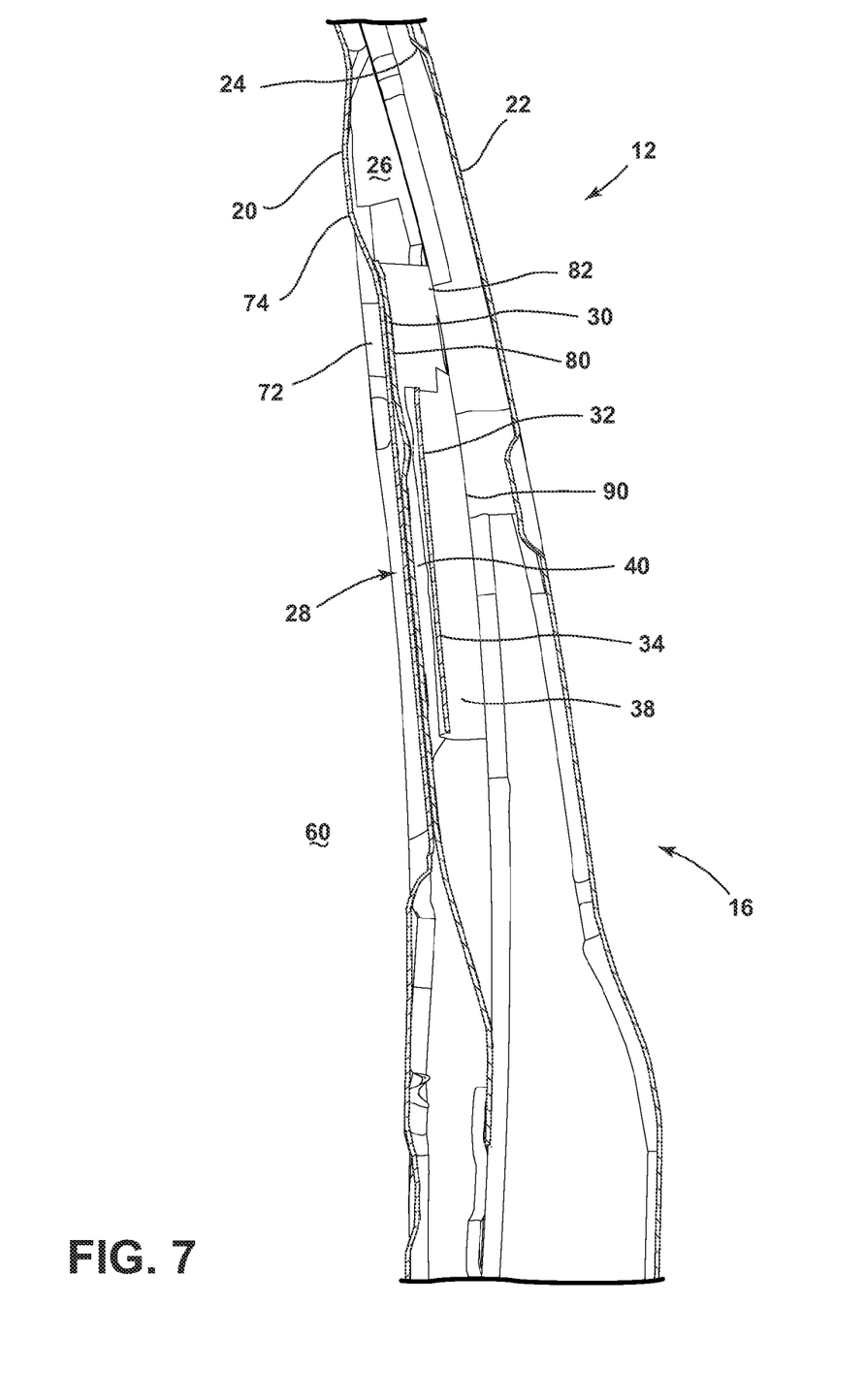
FIG. 7 is a detailed section of the embodiment of FIG. 2 taken at area VII.

As shown in FIGS. 5-7, the second reinforcement 32 includes a curved member having first and second edges 36, 38 with a channel 34 extending therebetween. The first and second edges 36, 38 are welded to the first reinforcement 30 proximate the crushing deflection area 28 where the inner member 20 and the outer member 22 of the B-pillar 16 are connected. The channel 34 of the second reinforcement 32 is positioned distal from the first reinforcement 30 such that the gap 40 is defined between the first and second reinforcements 30, 32. The first reinforcement 30 and second reinforcement 32 are positioned proximate the crushing deflection area 28 of the pillar such that, in a crash situation, the first and second reinforcements 30, 32 provide additional and dynamic structural support to the B-pillar 16, as will be more fully described below.

In various embodiments, the first and second edges 36, 38 of the second reinforcement 32 are welded to the first reinforcement 30 by a single line of welds 90 at the first and second edges 36, 38. Because only the edges of the second reinforcement 32 are welded to the first reinforcement 30, the first reinforcement 30 can deflect within the gap 40 independently of the second reinforcement 32 for the distance defined within the gap 40, as will be more fully described below. In various other embodiments, two lines of welds 90 can be used to connect the second reinforcement 32 to the first reinforcement 30, wherein the two lines of welds 90 at the first and second edges 36, 38 of the second reinforcement 32 provide a stronger connection between the first reinforcement 30 and the second reinforcement 32. In turn, the stronger connection results in additional structural support to the B-pillar 16 during a crash situation. It should be understood that additional lines of welds 90 and various alternate configurations of welds 90 can be used to attach the second reinforcement 32 to the first reinforcement 30. These alternate configurations can be used so long as the channel 34 of the second reinforcement 32 is distal from the first reinforcement 30 so that the gap 40 between the first reinforcement 30 and the second reinforcement 32 remains.

In various embodiments, the gap 40 between the second reinforcement 32 and the first reinforcement 30 is approximately 3 millimeters or more and preferably between approximately 3 millimeters to approximately 35 millimeters. In the illustrated embodiment, the gap is approximately 5 millimeters. In alternate embodiments, the gap can be larger or smaller depending on the configuration of the B-pillar 16, the manner in which the B-pillar 16 is designed to deflect, the materials used, and other design considerations. This distance can be measured from the greatest distance between the channel 34 of the second reinforcement 32 and the first reinforcement 30. The average distance can also be used to measure the gap 40. The second reinforcement 32 can be configured to taper toward the first reinforcement 30 proximate the first and second edges 36, 38 of the second reinforcement, wherein the gap 40 narrows in thickness leading up to the connection between the first and second reinforcements 30, 32. In various alternate embodiments, the B-pillar 16 may not include the first reinforcement 30. In such an embodiment, the second reinforcement 32 is welded to the inner and/or the outer members 20, 22 of the B-pillar 16 at the first and second edges 36, 38 of the second reinforcement 32 and the gap 40 may be defined between the channel 34 of the second reinforcement 32 and the inner member 20 of the B-pillar 16.

As illustrated in FIGS. 6 and 7, the gap 40 extends vertically along the entire length of the second reinforcement 32 such that the entire channel 34 is set apart from the first reinforcement 30. In various embodiments, the second reinforcement 32 can taper along the length of the second reinforcement 32 to match the general tapered shape of the B-pillar 16. In various other embodiments, the channel 34 of the second reinforcement 32 can include more than one channel where the second reinforcement 32 undulates to form two or more channels 34. In such an embodiment, the gap also defines an undulating geometry where the thickness of the gap 40 is not consistent and may, at certain portions, exceed 35 millimeters. The additional channels created by an undulating configuration of the second reinforcement 32 can provide additional structural support when the B-pillar 16 deflects into the gap 40 and engages the second reinforcement 32.

Figure 8A:
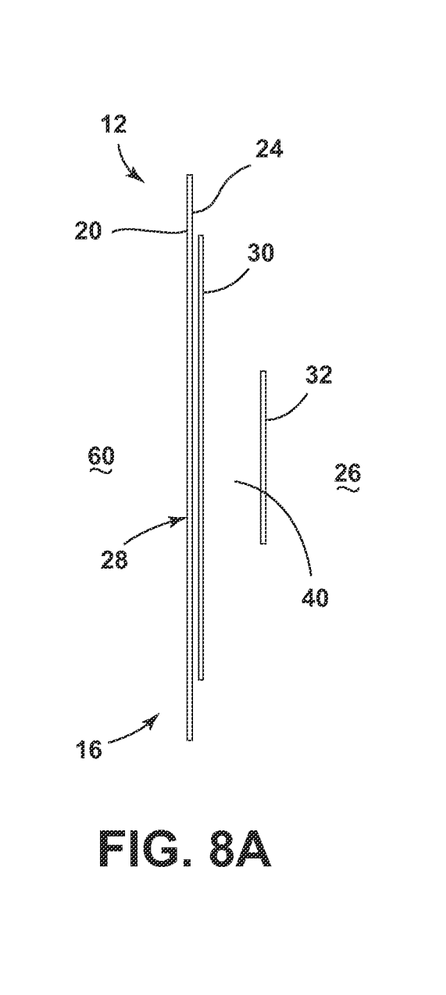
FIG. 8A is schematic detail of one embodiment of the invention showing the pillar with no deflection.
Figure 8B:
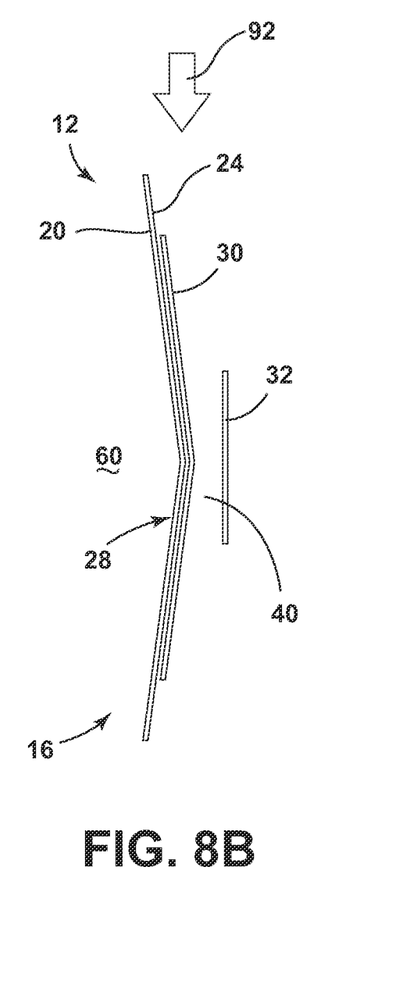
FIG. 8B is a schematic view of the embodiment of FIG. 8A showing a first deflection of the pillar.
Figure 8C:
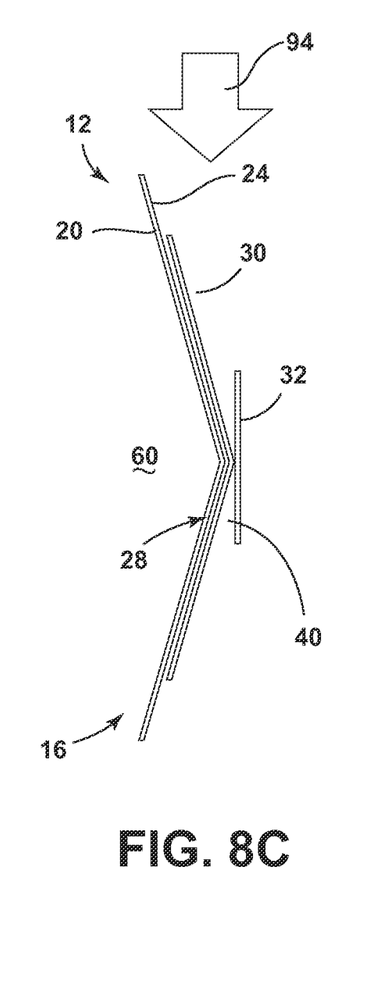
FIG. 8C is a schematic view of the embodiment of FIG. 8A showing a second deflection of the pillar.

Referring now to FIGS. 8A-8C, the schematic diagram of the operation of the crushing deflection area 28 is illustrated. As shown in FIG. 8A, the schematic shows the inner member 20 of the B-pillar 16 positioned on the cabin 60 side of the B-pillar 16, the first reinforcement 30 coupled with the inner member 20 and the second reinforcement 32 positioned distal from the first reinforcement 30, thereby defining the gap 40 between the first and second reinforcements 30, 32. FIG. 8B shows the B-pillar 16 in a first deflection distance due to the placement of a lesser crushing load 92 upon the roof 70 of the vehicle 10. The inner member 20 and the first reinforcement 30 show deflection such that the B-pillar 16 crumples in a direction outward from the cabin 60 of the vehicle 10 toward the second reinforcement 32. A certain amount of deflection of the inner member 20 and the first reinforcement 30 is permitted before the first reinforcement 30 engages the channel 34 of the second reinforcement 32. Where the gap 40 between the first reinforcement 30 and the second reinforcement 32 is greater, more deflection will occur before the first reinforcement 30 will engage the channel 34 of the second reinforcement 32.

As discussed above, the B-pillar 16 is configured such that when a crushing force is applied to the B-pillar 16, the crushing deflection area 28 will be the first portion of the B-pillar 16 to deflect. In this manner, the crushing deflection area 28 can be made to deflect first as a result of the geometry of the B-pillar 16, the configuration of the materials at the crushing deflection area 28, the placement of reinforcements adjacent to the crushing deflection area 28, or combinations of the above. As a result, the B-pillar 16 is permitted to deflect a predetermined distance such that the inner member 20 and the first reinforcement 30 deflect toward and into the second reinforcement 32 and, upon deflecting the predetermined distance, will engage the second reinforcement 32.

As illustrated in FIG. 8C, under a greater crushing load 94, the inner member 20 and the first reinforcement 30 will deflect a greater distance. Once the inner member 20 of the B-pillar 16 and the first reinforcement 30 deflect the predetermined distance, the first reinforcement 30 will engage the channel 34 of the second reinforcement 32. At this point, the second reinforcement 32 provides a supplemental structural support to the B-pillar 16 to minimize the amount of further deflection as a result of the downward force placed upon the roof 70 of the vehicle 10. In this manner, the B-pillar 16 includes a dynamic supplemental structural support designed to deflect in a predetermined location and a predetermined distance before additional structural support, in the form of the channel 34 of the second reinforcement 32, is engaged to bolster the B-pillar 16 and minimize further deflection of the B-pillar 16.

Because the second reinforcement 32 is welded only at the first and second edges 36, 38 of the second reinforcement 32, the inner member 20 and the first reinforcement 30 are permitted to deflect substantially independent of the channel 34 portion of the second reinforcement 32. In this manner, the channel 34 portion of the second reinforcement 32 will not deflect with the inner member 20 or the first reinforcement 30 when a crushing load is placed upon the roof 70 of the vehicle 10, until the predetermined amount of deflection occurs. This configuration provides a dynamic structural support that permits limited and a predetermined amount of deflection of the B-pillar 16 and additional structural support to the B-pillar 16 when the amount of limited and predetermined deflection is reached. In this manner, the integrity of the cabin 60 compartment can be held substantially intact to lessen the chance of injury to the occupants of the vehicle 10 during a crush-type impact.

In various embodiments, two or more second reinforcements 32 can be used at the crushing deflection area 28 to provide a second layer of dynamic support to the B-pillar 16 in situations where larger crushing type forces are applied to the roof 70 of the vehicle 10. Such an embodiment can be used in larger vehicles or vehicles that typically carry larger loads. In addition, in various embodiments, the B-pillar 16 may contain two or more crushing deflection areas, each having an independent and separate second reinforcement 32 configured to dynamically assist in providing support to a deflected portion of the B-pillar 16 as described above. In such an embodiment, the B-pillar 16 can be configured to deflect a predetermined distance at a first crushing deflection area until the corresponding second reinforcement 32 is engaged to provide supplemental support. If the crushing forces are great enough, an additional crushing deflection area then begins to deflect in a predetermined direction until another corresponding second reinforcement 32 is engaged to provide supplemental support to the deflected B-pillar 16. In various embodiments, the separate crushing deflection areas can be configured to deflect under crash-type forces substantially simultaneously. Also, depending upon the specific design of the vehicle 10 and the vehicle frame 12, the direction of the controlled deflection of the B-pillar 16 at the crushing deflection area during a crash can vary such that the exact location of the second reinforcement 32 can also vary to receive and provide supplemental dynamic support to the B-pillar 16.

In various alternate embodiments, the second reinforcement 32, as described above, can also be used in the A-pillar 14 and/or the C-pillar 18 of a vehicle 10 depending upon the design of the vehicle frame 12 and the configuration of the various crushing deflection areas of the vehicle frame 12. Also, in various embodiments, the second reinforcement 32, as described above, can be used in a variety of other members in a vehicle 10 frame 12 that have a substantially channel-shaped cross section within which the second reinforcement 32 can be placed. In addition, a second reinforcement 32, as described above, can be used in vehicles, such as pickup trucks, that have only an A-pillar 14 and a B-pillar 16.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle frame comprising:
   a pillar having an interior surface defining a pillar cavity and a deflection area;
   a U-shaped first reinforcement at least partially disposed on the interior surface at the deflection area; and
   a U-shaped second reinforcement coupled to and positioned within a cavity defined by the first reinforcement at first and second edges of the second reinforcement, wherein a continuous and uninterrupted gap is defined between a front of the first reinforcement and a rear of the second reinforcement proximate the deflection area, each of first and second reinforcements opening in a common direction toward the interior surface and the second reinforcement nested within the first reinforcement.

2. The vehicle frame of claim 1, wherein the second reinforcement includes a channel extending between the first and second edges, and wherein the gap is defined by the length of the channel and the first reinforcement.

3. The vehicle frame of claim 1, wherein each of the first and second edges is welded to the first reinforcement by a single row of welds.

4. The vehicle frame of claim 1, wherein each of the first and second edges is welded to the first reinforcement by two rows of welds.

5. The vehicle frame of claim 1, wherein the gap between the front side of the first reinforcement and the rear side of the second reinforcement is between approximately 3 mm to approximately 35 mm.

6. The vehicle frame of claim 5, wherein the gap between the front side of the first reinforcement and the rear side of the second reinforcement is approximately 5 mm.

7. The vehicle frame of claim 1, wherein the deflection area is configured to deflect outward relative to a passenger cabin of the vehicle a predetermined distance when a vertical force is applied to a roof of the vehicle, and wherein the first and second reinforcements engage one another to define a delayed deflection support when the deflection area has deflected the predetermined distance, and wherein the engagement of the first and second reinforcements in defining the delayed deflection support is configured to supply additional structural support to the pillar after the pillar and the first reinforcement have deflected the predetermined distance.

8. The vehicle frame of claim 1, wherein the vehicle includes a front side door and a rear side door, and wherein the pillar is disposed proximate a front side door and a rear side door.

9. A vehicle frame comprising:
a pillar having inner and outer members and an interior surface defining a cavity;
a first reinforcement having a first channel and disposed in the cavity and welded to the interior surface; and
a second reinforcement having first and second edges and a second channel extending therebetween, wherein the first and second edges are welded to the first reinforcement such that the second reinforcement is positioned within the first channel and the second channel is positioned to open away from the first reinforcement and towards a deflection zone defined within the inner member and distal from the second reinforcement to define a continuous gap between a front of the first reinforcement and a rear of the second reinforcement.

10. The vehicle frame of claim 9, wherein each of the first and second edges is welded to the first reinforcement by a single row of welds.

11. The vehicle frame of claim 9, wherein each of the first and second edges is welded to the first reinforcement by two rows of welds.

12. The vehicle frame of claim 9, wherein a rear side of the second channel of the second reinforcement and a front side of the first channel of the first reinforcement define a gap therebetween, wherein the gap is between approximately 3 mm and approximately 35 mm.

13. The vehicle frame of claim 12, wherein the gap is approximately 5 mm.

14. The vehicle frame of claim 9, wherein the deflection area is configured to deflect outward relative to an interior of the vehicle a predetermined distance when a vertical force is applied to a roof of the vehicle, wherein the first channel of the first reinforcement engages the second channel of the second reinforcement when the deflection area deflects the predetermined distance, and wherein the first and second reinforcements define a delayed deflection support when the deflection area has deflected the predetermined distance that is configured to supply additional structural support to the pillar and the first reinforcement after the pillar has deflected the predetermined distance.

15. The vehicle frame of claim 9, wherein the vehicle includes a cabin having a front cabin portion and a rear cabin portion, and wherein the pillar is a B-pillar disposed between the front cabin portion and the rear cabin portion.

16. A vehicle frame comprising:
a pillar having inner and outer members defining a cavity and a deflecting portion; and
first and second reinforcements within the cavity adjacent the deflecting portion, each of the first and second reinforcements having a U-shaped opening directed toward the inner member, the second inner reinforcement nested within the first reinforcement to define a continuous gap between a front of the first reinforcement and a rear of the second reinforcement.

17. The vehicle frame of claim 16, wherein the outward deflection zone deflects outward relative to an interior of the vehicle a predetermined distance when a vertical force is applied to a roof of the vehicle, wherein the U-shaped opening of the first reinforcement engages the rear of the second reinforcement when the outward deflection zone deflects the predetermined distance, and wherein the first and second reinforcements define a delayed deflection support when the deflection area has deflected the predetermined distance such that the engagement of the first reinforcement with the second reinforcement supplies additional structural support to the pillar after the pillar has deflected the predetermined distance.

18. The vehicle frame of claim 17, wherein the maximum gap defined between the first and second reinforcements is approximately 5 mm.

19. The vehicle frame of claim 18, wherein the vehicle includes a B-pillar positioned between a front side door and a rear side door, and wherein the pillar is disposed within the B-pillar.

20. The vehicle frame of claim 19, wherein the inner member and the second reinforcement deflect the predetermined distance in response to the vertical force, and wherein the first reinforcement is substantially free of deflection as the inner member and second reinforcement deflect the predetermined distance.

* * * * *